Sept. 13, 1966  P. E. RAMSEY  3,272,181
ANIMAL ACTUATED DRINKING FOUNTAIN

Filed April 22, 1965  2 Sheets-Sheet 1

Paul E. Ramsey
INVENTOR.

BY *Clarence A. O'Brien*
*and Harvey B. Jacobson*
Attorneys

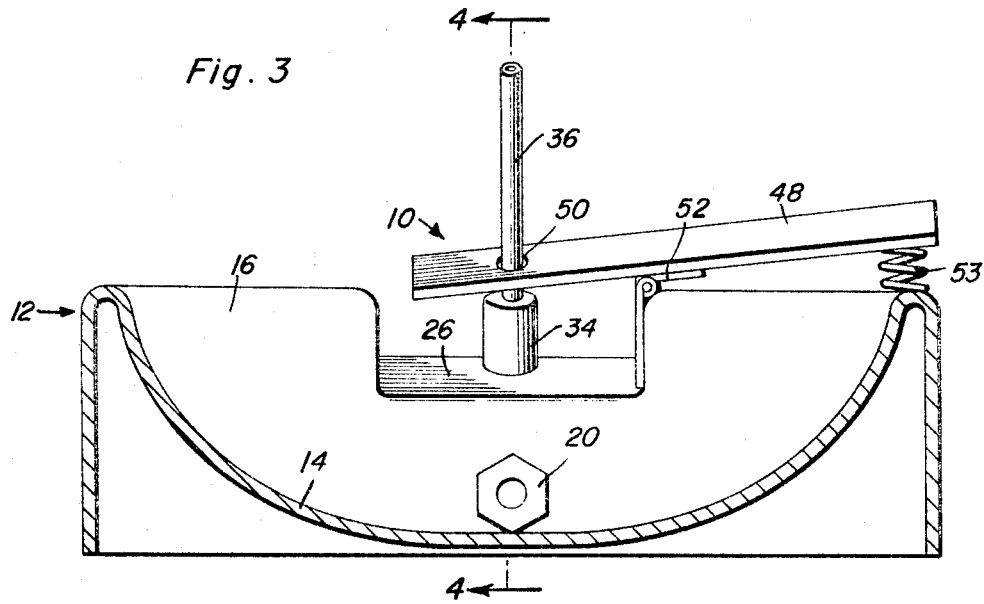
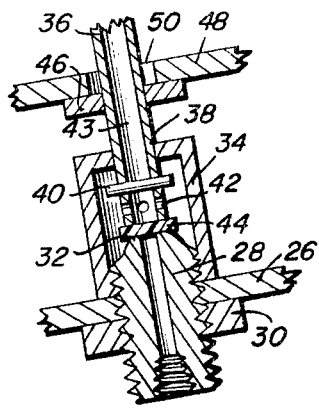
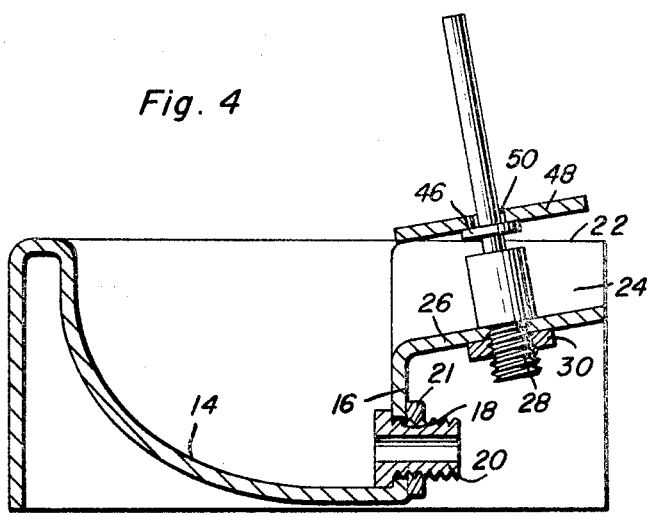

United States Patent Office 3,272,181
Patented Sept. 13, 1966

3,272,181
ANIMAL ACTUATED DRINKING FOUNTAIN
Paul E. Ramsey, Midland, Tex., assignor of five percent to H. M. Walters, Midland, Tex.
Filed Apr. 22, 1965, Ser. No. 450,005
6 Claims. (Cl. 119—76)

This invention relates to drinking fountains and more particularly to a drinking fountain which is for, and operable by, animals for obtaining water. The invention is specially designed for use by dogs, both as a means to obtain water and as a training device.

A primary object of the present invention is to provide a drinking fountain which has an operable panel thereon for allowing animals to operate the drinking fountain by a conscious applying of weight thereto.

A further object of the present invention is to provide a drinking fountain which may be used as a training means for dogs.

Another object of the present invention is to provide an animal drinking fountain which is economical to manufacture, simple is construction and is feasible for use with dogs and other animals.

A still further object of the present invention is to provide an animal drinking fountain primarily for use by dogs which has an elongated stem thereon extending substantially over the remaining parts of the drinking fountain to facilitate the obtaining of water by the animals.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a longitudinal cross-sectional view through the trough portion of the drinking fountain;

FIGURE 4 is an enlarged sectional view of the animal drinking fountain taken substantially along section line 4—4 of FIGURE 3; and FIGURE 5 is an enlarged detailed sectional view of the valve stem and valve seat used in this invention, and showing the operative relationship of the parts.

Figure 1:
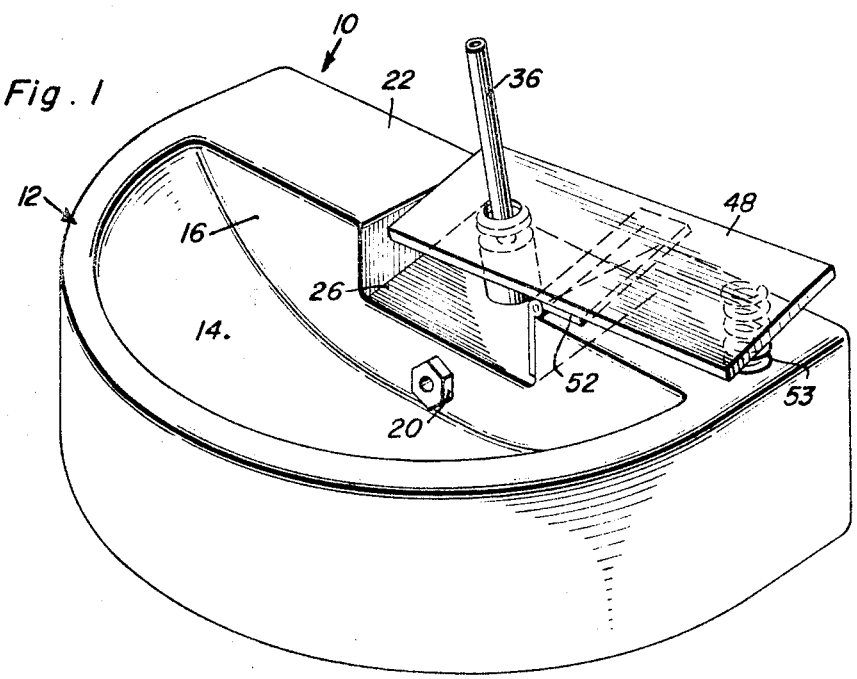
FIGURE 1 is a perspective view of the drinking fountain of the instant invention.

Referring now more particularly to the drawings, the animal drinking fountain 10 comprises a raised trough 12 having a semi-spherical bowl portion 14 sloping toward a centrally located low point adjacent the vertical wall 16. This wall has a drainage opening 18 therethrough adjacent the aforementioned low point. An externally threaded hollow male hose coupling 20 projects through and beyond the opening 18 and, by nut 21 threaded thereon, is locked to the wall 16 within the opening 18. In this manner, a drainage hose can be threaded on the projecting threaded end of the coupling 20 so as to conduct the overflow water away from the trough 12. It will be of course be appreciated that, if so desired, water can be retained in the trough by use of a removable plug.

In addition to the bowl portion 14 the trough 12 includes a flat platform portion 22 projecting outward from the top edge of the vertical wall 16. This platform portion 22 includes a central recess 24 having the bottom 26 thereof inclined toward the bowl portion 14.

An externally threaded and internally tapped elongated hollow plug 28 is threaded through the bottom 26 and locked thereto by a nut 30, the upper end 32 of the plug 28 forming a valve seat. A housing 34, threaded on the upwardly projecting end of the plug 28, encloses the valve seat 32 and forms a chamber thereabout. An elongate hollow water passageway valve stem 36 extends upwardly through an aperture 38 in the valve housing 34 a substantial distance above the valve housing with the lower portion thereof being retained within the valve housing 34 by means of a pin 40 extending transversely therethrough and limiting the upper movement of the valve stem 36. This valve stem 36 has apertures 42 communicating the housing chamber with the passage 43 therethrough above the solid sealing gasket 44 bonded to its lower end for seating on the valve seat 32 upon a depression of the stem 36. A washer 46 is fixed to the elongate valve stem 36 in spaced relation above the housing 34 so as to form an abutment. A flat plate or operating bar 48 has an aperture 50 therein at one end thereof, which aperture is adapted to fit over the elongate stem 36 so as to allow the plate 48 to rest against the washer 46. This operating plate 48 is pivotally connected to the trough 12 by means of a hinge 52 which has one leaf thereof attached to the bottom of the plate and the other leaf thereof attached to the side of the recess 24. An expanded compression spring 53 is mounted between the undersurface of the operating bar or plate 48 and the top of the flat platform 22. In this manner, the valve stem 36 is normally biased downward with the sealing gasket 44 abutting against the seat 32 of the plug 28 by the action of the spring 53, the operating bar 48 pivoting on the hinge 52 and pressing against the washer 46 to thereby force the valve stem 36 down.

Figure 2:
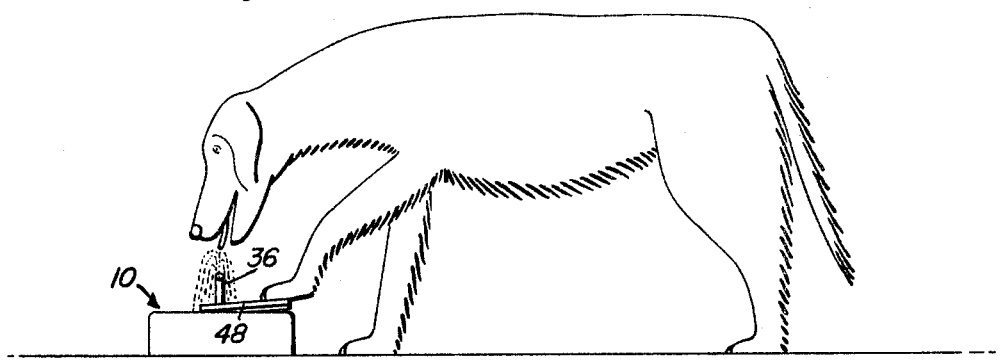
FIGURE 2 is a side elevational view of the drinking fountain and showing the fountain being used by a dog.

When the operating bar 48 is manipulated in the manner of a pedal by the action of an animal treading thereon, as illustrated in FIGURE 2, the operating bar 48 will pivot about the hinged pivot point to thereby allow the valve stem 36 to move upwardly away from the seat 32 under the pressure of fluid which in turn flows from a pressurized fluid source through the hollow plug 28, a suitable fluid conduit being secured to the lower threaded end of the plug 28. The fluid forcing the gasket 44, and thereby the stem 36, upwardly will pass into the housing 34 and the chamber therein and thereafter through the apertures 42 in the stem 36 and upwardly through the stem 36 and outwardly thereof in a water spout, whereby the animal operating the watering device may obtain drinking water therefrom. The water which is unused by the animal will, through the inclination of the stem 36 which in turn results from the sloping of the bottom 26, run down into the bowl portion 14 of the trough 12. Thereafter, the water will pass through the drainage aperture 18 and any conduit extending therefrom.

The watering trough is normally made hollow and may be made from metal or plastic as desired. Further, by positioning the pedal or plate 48 in a raised position, and at an inclination, the device can be used to train animals to assume an other than normal position to obtain a reward, in this instance a drink of water.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An animal actuated watering device comprising a trough having a bowl portion therein, a tubular valve seat on said trough outward of said bowl portion, a housing on said trough defining a fluid chamber about said valve seat, an aperture in said housing, an elongate hollow water passageway-type valve stem extending through said aperture and in water receiving and sealing engagement with said housing, said stem having a sealing means on the bottom thereof adapted to sealingly seat on said valve seat, said elongate stem extending substantially beyond said housing, an abutment means secured to said stem beyond said housing, an elongated operating plate having a first end thereof over said abutment means, said plate extending outward from said stem, means pivotally mounting said plate at an intermediate point along the length thereof, and a spring engaged with the outer end of the plate and biasing the first end thereof against the abutment means which in turn effects a seating of the stem, whereby said plate may be actuated by depressing the outer end thereof, to allow fluid pressure to lift said stem from its seat.

2. An animal drinking fountain comprising an enlarged raised trough, said trough having a recessed bowl portion, and a raised platform portion adjacent said bowl portion, a section of said platform portion being inclined toward said bowl portion, a hollow plug extending through said inclined section, the lower end of said plug being adapted for communication with a fluid conduit, the upper end of said plug defining a valve seat, a housing defining closed fluid chamber surrounding said valve seat, a hollow water passageway-type valve stem slidably mounted in said housing and open thereto for free movement toward and away from said valve seat, sealing means on the inner end of said valve stem for selective sealing engagement with said valve seat, said valve stem projecting outwardly of said housing and inwardly toward said bowl portion, fluid passage means communicating said chamber and the outer end of said valve stem, and animal operated means for selectively moving the valve stem and sealing means away from the valve seat so as to allow for a fluid flow into said chamber and through said stem.

3. The drinking fountain of claim 2 wherein said means for allowing movement of the valve stem includes an abutment means fixed on said stem, an elongated plate having a first end thereof freely engaged over said stem and with said abutment means, means pivotally mounting said plate at the center thereof, and means resiliently engaged with the second end of said plate and resiliently biasing the first end thereof downwardly against said abutment means so as to bias the sealing means on the stem against the valve seat.

4. The drinking fountain of claim 3 wherein said inclined section is recessed relative to the platform portion, the pivotal mounting of said plate being along one edge of the recessed inclined section.

5. The drinking fountain of claim 4 including a drainage aperture through said bowl portion, and a hose coupling fixed within and projecting outwardly beyond said aperture.

6. An animal actuated watering device comprising a trough having a bowl portion therein, a tubular valve seat on said trough outward of said bowl portion, a housing on said trough defining a fluid chamber about said valve seat, an aperture in said housing, an elongate hollow water passageway-type valve stem extending through said aperture and in water receiving and sealing engagement with said housing, said stem having a sealing means on the bottom thereof adapted to sealingly seat on said valve seat, said elongate stem extending substantially beyond said housing, an abutment means secured to said stem beyond said housing, an elongated operating plate having a first end thereof over said abutment means, said plate extending outward from said stem, means pivotally mounting said plate, and means engaged with the plate and biasing the first end thereof against the abutment means which in turn effects a seating of the stem, whereby said plate may be actuated to allow fluid pressure to lift said stem from its seat.

References Cited by the Examiner
UNITED STATES PATENTS

| | | | |
|---|---|---|---|
| 1,064,540 | 6/1913 | Regar | 119—76 |
| 1,069,233 | 8/1913 | Corey | 4—166 |
| 1,127,633 | 2/1915 | Kenney | 239—32 |
| 1,218,797 | 3/1917 | Murdock | 239—29.5 |
| 1,894,563 | 1/1933 | Jones | 119—76 |
| 3,044,446 | 7/1962 | Vanderhoven | 119—75 |

SAMUEL KOREN, *Primary Examiner.*

ALDRICH F. MEDBERY, *Examiner.*